United States Patent [19]
Tsuda

[11] 3,778,101
[45] Dec. 11, 1973

[54] SEALING ARRANGEMENT FOR VEHICLE BODY CONSTRUCTION
[75] Inventor: Yasuhisa Tsuda, Tokyo, Japan
[73] Assignee: Nissan Motor Company, Limited, Kanagawa-ku, Yokohama, Japan
[22] Filed: July 10, 1972
[21] Appl. No.: 270,170

[30] Foreign Application Priority Data
July 10, 1971 Japan.............................. 46/4650677

[52] U.S. Cl.................................. 296/154, 49/502
[51] Int. Cl................................................. B60j 5/04
[58] Field of Search............................ 296/146, 154; 49/502

[56] References Cited
FOREIGN PATENTS OR APPLICATIONS
| 808,249 | 1/1959 | Great Britain........................ 49/502 |
| 1,123,575 | 7/1959 | Germany.............................. 49/502 |

Primary Examiner—Leo Friaglia
Assistant Examiner—Leslie J. Paperner
Attorney—John Lezdey

[57] ABSTRACT

A sealing arrangement used in a vehicle body construction for intercepting from the occupant compartment any water flowing into an enclosure accommodating therein a side window. The sealing arrangement is provided with upper and lower inner panels which are partially juxtaposed at a spacing from each other. The partially juxtaposed portions of the two panels define therebetween a water passage. The upper panel has at least one partially offset lowermost end adhered to the base enclosure member. A sealing partition is interposed between the two panels to extend midway of the water passage. Any water having stolen into the enclosure is blocked by the sealing partition and then is drained to the exterior of the vehicle body through a water vent formed in the base member.

8 Claims, 3 Drawing Figures

PATENTED DEC 11 1973   3,778,101

SEALING ARRANGEMENT FOR VEHICLE BODY CONSTRUCTION

The present invention relates generally to vehicle body construction and more specifically to a sealing arrangement for intercepting from the occupant compartment any water flowing into an enclosure accommodating therein a side window.

It is the current practice in motor vehicle construction to form a plurality of windows in an inner panel which is a structral member of an enclosure accommodating therein a side window. These windows are used when mounting or reparing of driving members of the side window is to be made. The provision of such windows has, however, presented a serious problem of water sealing. More specifically, when the vehicle is moving at a high speed, rain water may be driven by the wind into the enclosure through a restricted clearance formed between the side window and the enclosure elements. The rain water having flown into the enclosure may pass through the windows toward the occupant compartment. Then, the rain water may enter the compartment. if the sealing between one of the enclosure element and an inner trim wall is not provided, which is usually made of a thin plate covered with a thin sheet of vinyl.

A variety of vehicle body construction have been proposed to remedy this disadvantage, in one of which a sealing partition is provided between the inner panel and the inner trim wall for preventing the rain water having stolen through the windows from leaking into the occupant compartment. According to this conventional body construction, the sealing partition which warps slightly inside is secured to the inner panel at its overall periphery, and a water vent is formed in the inner panel at its lower end portion which is located at a slightly higher level than the lowermost periphery of the sealing partition. With this structural arrangement, however, the water interception performance is often deteriorated. This is because the sealing of the lowermost periphery of the sealing partition is an important factor but is often damaged due to vibrations and shocks experienced when the vehicle is running. As dusts or rubbish accumulate in the lowermost portion of the space defined by the inner panel and the inner trim wall, the water vent may be blocked by the accumulated dusts or rubbish. Then, the confined water will give an excessive damage to the sealed portion, namely, the lower periphery of the sealing partition.

Another conventional vehicle body construction is intended to improve sealing stability which is impossible in the former construction by the fact that the inner panel has formed at its lower end a longitudinal slit through which the sealing partition extends downward and outward. In this instance, the lower periphery of the sealing partition is not secured to the inner panel so that mounting thereof can be simplified. As quite understandable, the accumulation problem is thus solved in accordance with this body construction. However, another problem arises in that rigidity or local mechanical strength of the particular construction is considerably reduced due to the formation of the elongated slit.

The present invention, therefore, contemplates to provide a sealing arrangement used in a vehicle body construction for intercepting any water from the occupant compartment without unfavorably affecting rigidity of the arrangement. According to the concept of the invention, the inner panel is divided into upper and lower inner panels which are partially juxtaposed at a spacing from each other. The partially juxtaposed portions of the two panels define therebetween a water passage having its upper and lower ends open. The upper panel has at least one partially offset lowermost end adhered to the base enclosure member or to the lower panel. The sealing partition is adhered to the upper panel at its upper and side periphery and extends midway of the water passage. With these arrangements, water having stolen into the enclosure is blocked by the sealing partition and then is drained through a water vent formed in the lowermost portion of the base enclosure member to the exterior of the vehicle body after it flows down along the sealing partition.

Figure 1:
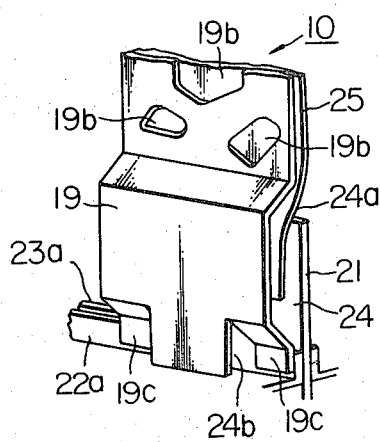
FIG. 1 is a cutaway view showing a side window enclosure incorporating the sealing arrangement according to the present invention.
Figure 2:
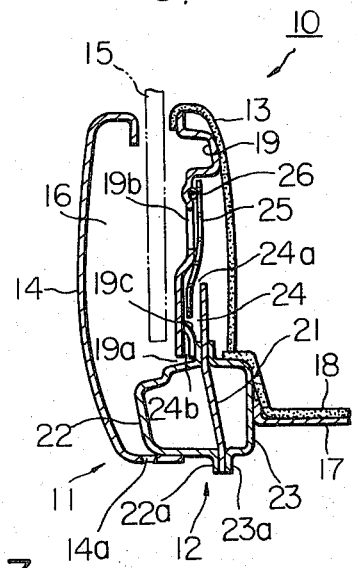
FIG. 2 is a sectional view taken along line 2—2 of FIG. 1.

Referring now to FIGS. 1 and 2, the sealing arrangement of the invention is generally designated at numeral 10. An enclosure 11 is composed of a base sill structure 12, an inner trim wall 13 and an outer fender wall 14. A side window 15 is vertically slidably received by the inner trim wall 13 and the outer fender wall 14 into a space 16 defined by the enclosure 11. The outer fender wall 14 is adhered to the base sill structure 12, which in turn is secured to a floor board 17. This floor board 17 may be covered with a floor mat 18, the upper extension of which may be in contact with the lowermost end of the inner trim wall 13, as shown.

A water vent 14a is formed at the lowermost end of the outer fender wall 14 for draining water, if it flows into the space 16.

According to the present invention, the sealing arrangement 10 is provided with an upper inner panel 19 and a lower inner panel 21. The upper inner panel 19 depends from the upper portion of the inner trim wall 13 toward the base sill structure 12 substantially in parallel with the side window 15. Thus, a clearance 19a is left between the lowermost end of the upper inner panel 19 and the upper most portion of the base sill structure 12. A suitable number of windows 19b may be formed in the upper panel 19 for providing easy access therearound. The lower inner panel 21 is partially juxtaposed inside of and at a spacing from the upper panel 19. In this instance, the base sill structure 12 is divided into two outer and inner members 22 and 23 having corresponding flanged portions 22a and 23a. The lower portion of the lower panel 21 is securedly interposed between the two flanged portions 22a and 23a. In this way, the partially juxtaposed portions of the outer and inner panels 19 and 21 define therebetween a water passage 24 keeping its upper and lower ends 24a and 24b open.

A sealing partition 25 is adhered to the upper panel 19 at its upper and side periphery and extends midway of the water passage 24. This adhesion may be made with use of some suitable adhesion. For improving mechanical strength of the sealing arrangement 10, it is preferred that the upper panel is provided with at least one offset portion 19c at its lowermost end, which offset portion may be adhered either to the flanged portion 22a of the base sill structure 12 or to the upper portion of the lower panel 21.

When, in operation, the vehicle is running at a high speed, rain water is blown into the space 16 in the enclosure 11 through a clearance inevitably formed between the side window 15 and the uppermost ends of the outer fender wall 14 and the inner trim wall 13. Although the major amount of the blown water drops downwardly of the space 16 and is drained through the water vent 14a to the exterior of the vehicle, the remaining minor but inneglible amount of the water moving toward the interior of the vehicle passes through the windows 19b. The water having passed through the windows 19b, however, is blocked or intercepted by the sealing partition 25 and is forcedly guided to flow down along the outer surface of the sealing partition 25. The guided water then passes through the water passage 24 and thereafter through the clearance 19a. Thus, all the water having stolen into the space 16 is gathered by the bottom of the outer fender wall 14 so that it is drained through the water vent 14a to the exterior of the vehicle.

Figure 3:
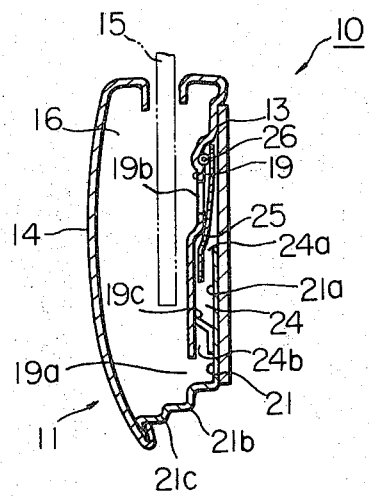
FIG. 3 is similar to FIG. 2 but shows another embodiment of the sealing arrangement.

In FIG. 3, like reference numerals will indicate counterparts as shown in FIGS. 1 and 2. In this embodiment, the sealing arrangement 10 of the invention is incorporated into a vehicle door structure. Thus, the base sill structure 12 of FIG. 1 is dispensed with so that the lower inner panel 21 plays the part of the base sill structure 12. In other words, the lower panel 21 is provided with a vertical portion 21a adhered to the inner trim wall 13 and a stepped base portion 21b hemmed at its extending end to the lowermost end of an outer panel wall 14. It should be noted in this instance that the water vent 21c is located in the base portion 21b, so that the hemmed flange with the outer panel 14 can be left. However, other structural relationship of the enclosure members and the resultant operation are considered similar to the former embodiment of FIGS. 1 and 2, thus making further detailed explanation unnecessary.

The features obtained according to the present invention will be itemized as follows:

1. Since the inner panel is divided into two upper and lower panels which are respectively adhered to the surrounding structural members of the enclosure, the rigidity or mechanical strength of the body construction is remarkably increased.
2. The adhesion of the sealing partiion is made only at its upper and side periphery with the lower periphery left unadhered, so that the adhesion process can be considerably simplified. 3. The provision of the unadhered lower periphery can diminish the leakage of the blown water, because, when it is an adhered lower periphery, its separation from the surrounding member due to the vibrations or shocks is a major cause for the leakage of the conventional type. 4. Since rough adhesion can meet the requirement of the invention, efforts devoted for mounting the sealing partition is considerably reduced. 5. The spacing between the upper and lower inner panels can be selected at will so that the problem of accumulation of dusts or rubbish is completely solved to afford a stable drain performance.

What is claimed is:

1. In a vehicle body construction including a base sill structure, an inner trim wall and an outer fender wall ahdered to the base sill structure and having a water vent formed at its lowermost end, all of which define a space for accommodating a vertically slidable side window, a sealing arrangement for intercepting any water from the occupant compartment, comprising in combination:

an upper inner panel substantially vertically depending from the upper portion of the inner trim wall toward the base sill structure for leaving a clearance therebetween;

a lower inner panel partially juxtaposed inside of and at a spacing from said upper inner panel and adhered to the base sill structure, the partially juxtaposed portions of said upper and lower inner panels defining therebetween a water passage having its upper and lower ends open; and a sealing partition adhered to said upper inner panel at its upper and side periphery and extending midway of said water passage;

whereby water having flown into the space through a clearance formed between the side window and the uppermost ends of the outer fender wall and the inner trim wall is intercepted by said sealing partition and then is drained through the water vent to the exterior of the vehicle body after it flows down through said water passage and the first-named clearance.

2. A sealing arrangement as claimed in claim 1, wherein said upper inner panel has formed therein a plurality of windows for providing easy access therearound.

3. A sealing arrangement as claimed in claim 1, wherein said upper inner panel has at least one partially offset lowermost end adhered to the base sill structure.

4. A sealing arrangement as claimed in claim 1, wherein said upper inner panel has at least one partially offset lowermost end adhered to said lower inner panel.

5. In a vehicle body construction including an inner trim wall and an outer panel wall, both of which define a space for accommodating a vertically slidable side window, a sealing arrangement for intercepting any water from the occupant compartment, comprising in combination:

a lower inner panel having a vertical portion adhered to the inner trim wall and a stepped base portion hemmed at its extending end to the lowermost end of the outer panel wall, said stepped base portion being provided with a water vent formed at its lowermost end;

an upper inner panel adhered at its upper end to the uppermost end of the inner trim wall and substantially vertically depending therefrom toward said stepped base portion for leaving a clearance therebetween, said upper inner panel being partially juxtaposed outside of and at a spacing from said lower inner panel for defining therebetwen a water passage having its upper and lower ends open; and a sealing partition adhered to said upper inner panel at its upper and side periphery and extending midway of said water passage, whereby water having flown into the space through a clearance formed between the side window and the uppermost ends of the outer panel wall and the inner trim wall is intercepted by said sealing partition and then is drained through said water vent to the exterior of the vehicle body after it flows down through said water passage and the first-named clearance.

6. A sealing arrangement as claimed in claim 5, wherein said upper inner panel has formed therein a plurality of windows for providing easy access therearound.

7. A sealing arrangement as claimed in claim 5, wherein said upper inner panel has at least one partially offset lowermost end adhered to the vertical portion of said lower inner panel.

8. A sealing arrangement as claimed in claim 5, wherein said upper inner panel has at least one partially offset lowermost end adhered to the stepped base portion of said lower inner panel.

* * * * *